March 29, 1966  R. B. BRUNDAGE  3,243,688
ALTERNATOR TYPE WELDER
Filed Dec. 26, 1962  3 Sheets-Sheet 1
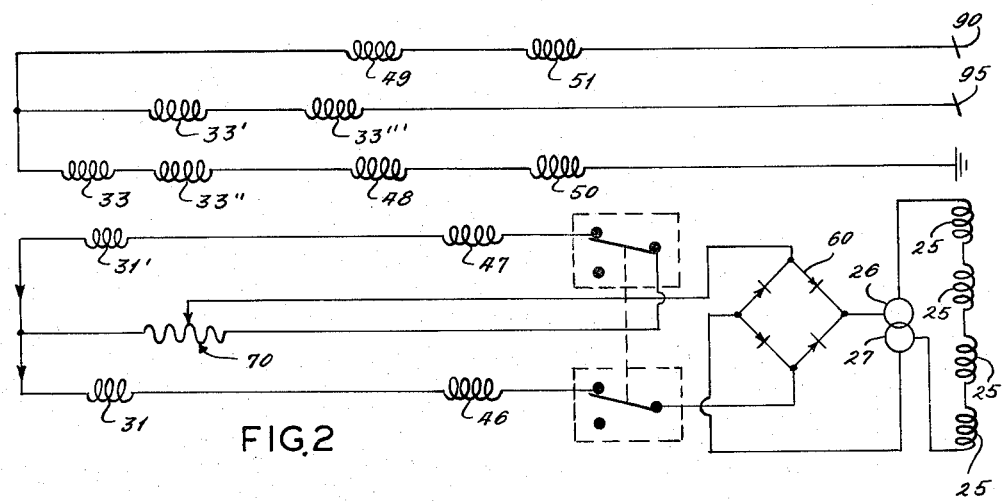
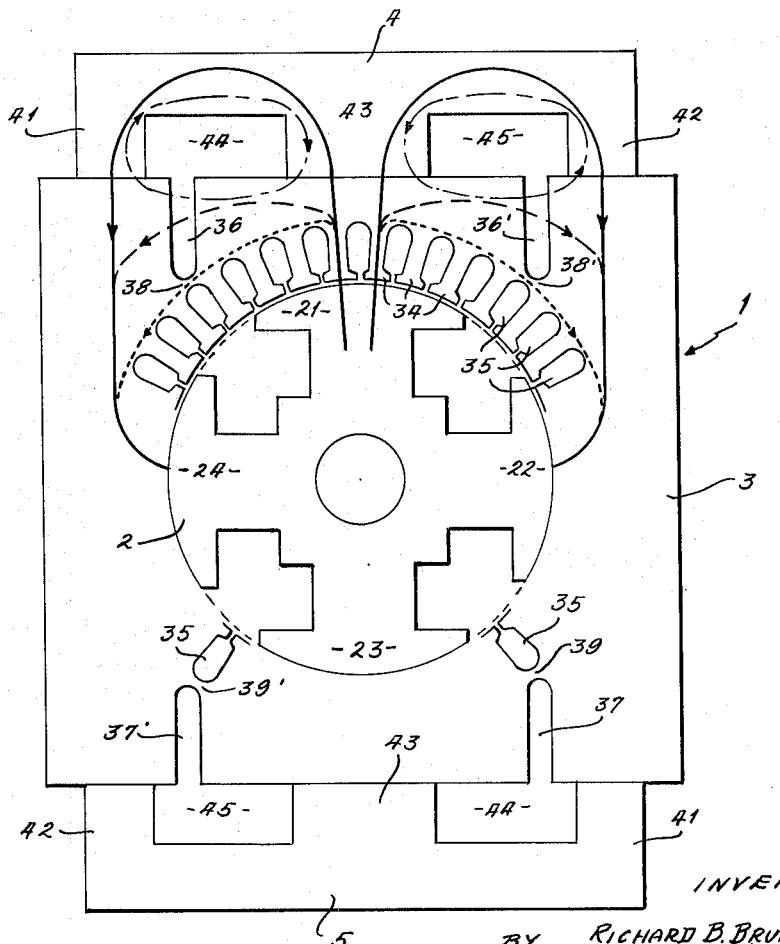
INVENTOR:
RICHARD B. BRUNDAGE
BY
ATTORNEYS.

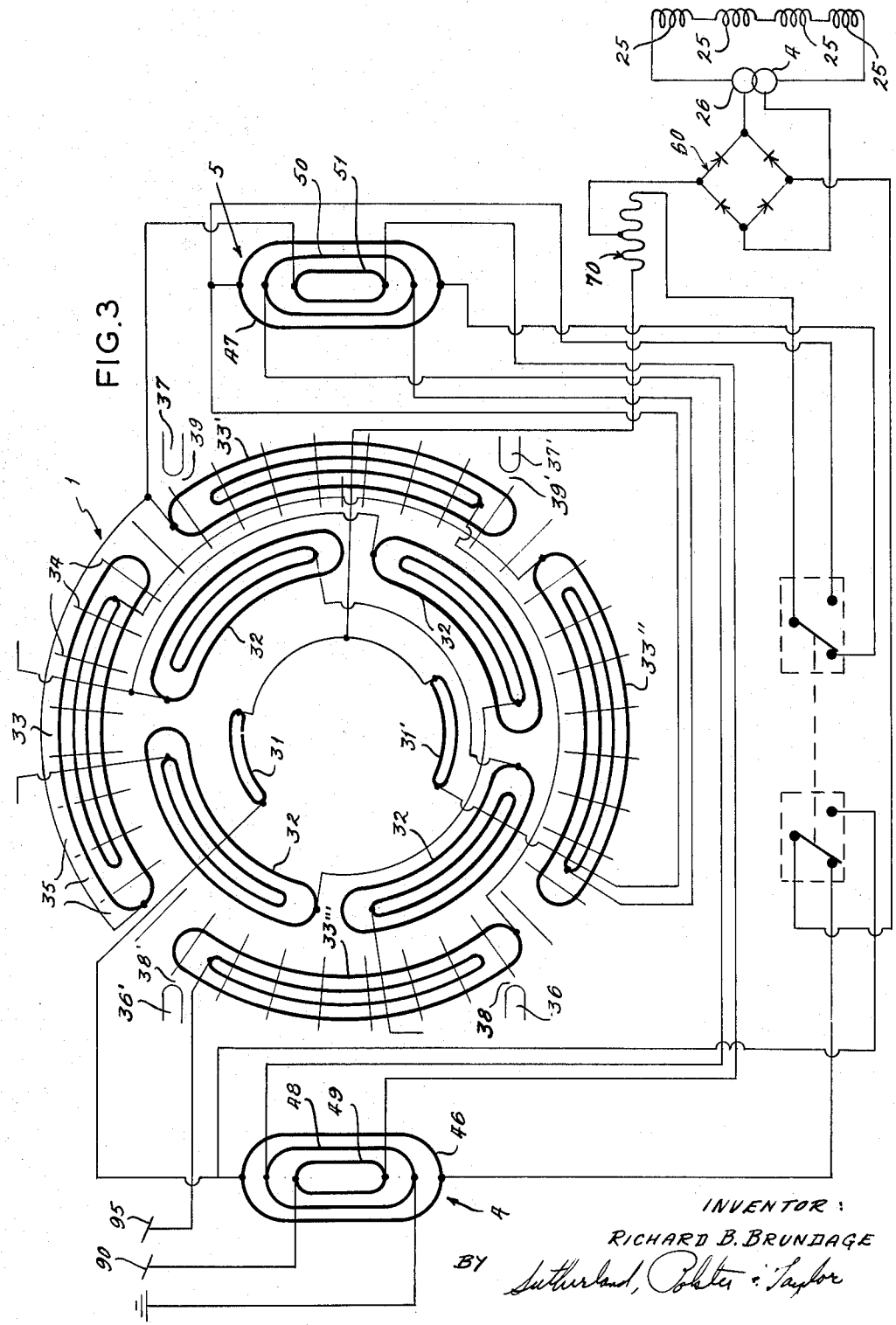

March 29, 1966  R. B. BRUNDAGE  3,243,688
ALTERNATOR TYPE WELDER

Filed Dec. 26, 1962  3 Sheets-Sheet 3

INVENTOR:
RICHARD B. BRUNDAGE
BY
ATTORNEYS.

3,243,688
ALTERNATOR TYPE WELDER
Richard B. Brundage, Clayton, Mo., assignor to Emerson
 Electric Co., a corporation of Missouri
Filed Dec. 26, 1962, Ser. No. 247,139
14 Claims. (Cl. 322—57)

This invention relates to rotating A.C. welding machines, of the type now commonly driven by an internal combustion engine but which may be driven by any suitable source of power.

Rotating A.C. welding machines now in use commercially include a wound rotor, excited by a separate D.C. generator, a wound stator the voltage output of which is more or less constant, and a reactor, connected in series with the stator and, during welding, with the welding arc.

While the separate D.C. generator is frequently connected to the rotor through a small rheostat, so that the output current can be, to a limited extent, varied by adjustment of the rheostat, the output control by this means is limited by close maximum and minimum open circuit voltages, normally within the range of 15–20% of the total range. Accordingly, in order to obtain different output currents, the reactor is provided with numbers of winding taps, which provide discrete current levels at each tap.

One of the objects of this invention is to provide a rotating A.C. welding machine in which no separate D.C. generator is required.

Another object is to provide a rotating A.C. welding machine in which the rotor is excited in such a way as to combine high arc stabilizing E.M.F. with low open circuit voltage, to reduce heating of the rotor winding, particularly at open circuit, and to facilitate a wide-range of continuous control.

Another object of this invention is to provide a rotating A.C. welding machine in which the stator and reactor are so combined as to make more effective use of conductor and iron than is achieved in conventional configuration, and to provide an economical means of achieving continuous current control over a wide range.

Other objects will become apparent to those skilled in the light of the following description and accompanying drawing.

In accordance with this invention, generally stated, a rotating A.C. welder is provided in which the physical and electrical relationships between a reactor and the stator and rotor of an alternator are such as to provide means to eliminate the separate D.C. generator required by the present commercial practice, to combine high arc stabilizing E.M.F. with low open circuit voltage, to reduce heating of the rotor winding, to reduce iron losses, and to make possible continuous control over a wide range, all with less active material than has been employed heretofore.

To this end, rotor exciting winding is provided in the stator, electrically connected to the rotor to produce a low voltage excitation of the rotor at open circuit. A rotor exciting winding is provided in the reactor, also electrically connected to the rotor and to the rotor exciting winding in the stator, and load responsive means are provided which act, upon the flow of current through them, to cause voltage generated in the reactor-based rotor exciting winding to augment the voltage of the stator-based rotor exciting winding to produce a high arc stabilizing E.M.F.

More specifically, weld winding in the reactor is used as the load-responsive means. During open circuit operation of the machine, after the initial excitation of the rotor, there is no current flow through the weld winding of the reactor. When the welding electrode is grounded to strike an arc, however, there is a large flow of current, through the weld winding of the reactor, which generates flux in the reactor iron, which in turn produces in the reactor exciting winding a voltage which supplements the voltage of the stator exciting winding. At short circuit, the two voltages are substantially additive or, to view it another way, are substantially in phase. After the arc is struck, a phase change in the reactor portion of the exciting winding decreases the net excitation to an intermediate value.

In this way, the open circuit voltage is kept low, and the short circuit current is quite high relative to the welding current. For reasons which are explained below, the arc-sustaining voltage is also high, and the response-time required to meet changing conditions is short.

Means are provided to vary the voltage from the rotor exciting winding to the rotor. In the preferred embodiment a variable transformer or controlled rectifier is provided between the exciting windings and the rotor, and the voltage to the rotor can be regulated continuously through a wide range.

In the preferred embodiment, the rotor-energizing windings of the stator and reactor are so related that a voltage is generated in the reactor-based rotor exciting winding at open circuit, which is almost directly opposed to the voltage of the stator-based rotor-exciting winding. In this way the increase from the voltage at open-circuit to the voltage at short circuit, at which the two exciting coils are supplementing one another, is very large. In the preferred embodiment, the reactor-based rotor-exciting winding has about the same number of turns as the stator-based rotor-exciting winding, but they do not opposite completely at open circuit. As has been indicated, the phase and amplitude of the reactor-based rotor-exciting winding vary greatly with the level of excitation and with the load current, whereas the stator-based rotor-exciting winding is fixed in phase and varies in amplitude according to the stator saturation characteristic.

The physical relation of the reactor and stator, in the preferred embodiment, is such that the stator and reactor iron together provide a flux path at open circuit. An air gap is provided, so positioned that at open circuit it diverts the rotor flux through the reactor, and under load, the flux path in the stator iron is through the air gap. Preferably, a narrow bridge of iron is provided between the air gap and the roots of the slot-defining teeth of the stator immediately adjacent the air gap, which shunts flux nearly completely until the iron of the bridge saturates. This permits excitation to build up easily at the start, from the residual magnetism in the rotor and then to "pre-saturate" the bridge at the proper phase, to remove the bridge from the reactor-stator magnetic circuit. After the bridge is presaturated by the rotor flux, the flux path at open circuit is chiefly through the reactor. It is this flux which produces the opposing voltage in the reactor-based rotor-exciting winding.

Under load, the flux generated by the weld winding of the reactor diverts the rotor flux to a path through the stator iron and the air gap, and produces in the reactor-based rotor-exciting winding the substantially independent voltage which supplements the voltage of the stator-based rotor-exciting winding.

In the preferred embodiment, the physical and electrical relation of the stator and reactor iron and windings and of the rotor are such as to produce a higher arc stabilizing voltage than the open circuit voltage. This is believed to result from the almost instantaneous resumption of the open circuit path of rotor flux through the reactor when no current is flowing through the reactor based weld winding, while the inductance of the rotor winding provides a continued high level of excitation for several cycles. The voltage induced in the reactor based weld winding supplements the voltage of the stator based weld winding and produces a relatively high weld voltage for several cycles, sufficient to restart the arc. If the electrode is withdrawn from the work piece, so that the arc is not restarted, the excitation decays to open circuit condition.

In the drawing, FIGURE 1 is a fragmentary, somewhat diagrammatic view in end elevation of the iron of an alternator and reactors forming a part of the welder of this invention, with lines indicating flux paths;

FIGURE 2 is a circuit diagram illustrating the circuit of one embodiment of welder of this invention;

FIGURE 3 is a diagrammatic representation of the windings of the alternator and reactors shown in FIGURE 1, indicating the distribution of windings in the stator, showing the relation of the alternator and reactor windings to the rest of the circuit illustrated in FIGURE 2;

Figure 4:
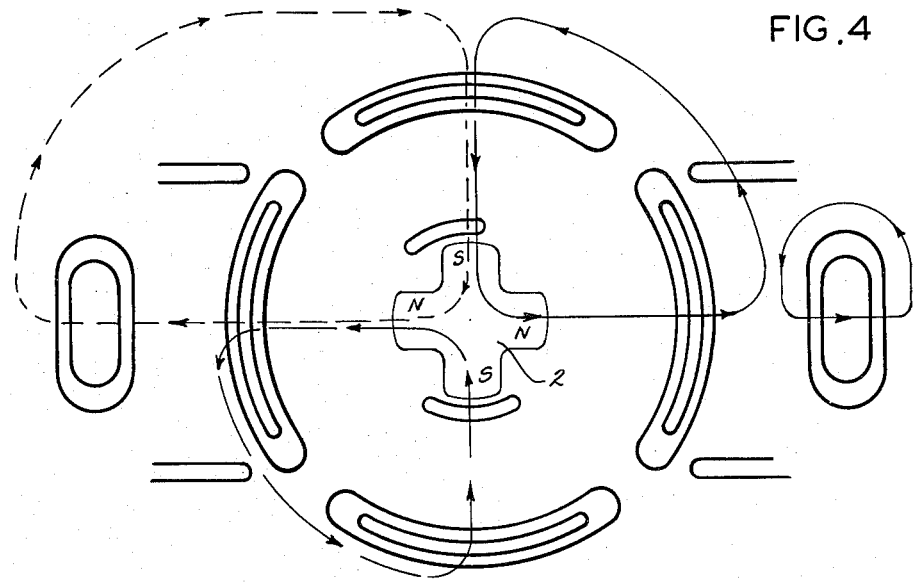
FIGURE 4 is a simplified diagrammatic representation of a portion of the windings shown in FIGURE 3, with lines indicating flux paths corresponding to the flux paths shown in FIGURE 1.

Referring now to the drawing for one illustrative embodiment of welder of this invention, reference numeral 1 indicates an alternator, including a rotor 2, a stator 3 and, in this preferred embodiment, reactors 4 and 5, the cores of which are welded to opposite sides of the stator 3.

The rotor 2 is provided with four poles 21–24, each with a corresponding winding 25. The rotor is mechanically connected to be rotated by an internal combustion engine, not here shown.

The stator is provided with three sets of windings, shown diagrammatically in FIGURE 3. These consist of stator based rotor exciting windings 31 and 31', auxiliary windings 32 and main weld windings 33, 33', 33" and 33'''. For the purposes of this invention, the auxiliary windings 32 serve no function, and are indicated only to illustrate the condition obtaining in a commercial embodiment of welder of this invention where they are used to generate electricity for purposes other than welding. Neither they nor the starting and ignition system of the internal combustion engine which also forms a part of the electrical system of the commercial welder, as shown in FIGURES 2 and 4.

The stator 3 is made up of a multiplicity of aligned laminations and the reactors 4 and 5 are similarly made up of laminations. Each of the stator laminations is identical, and is punched to provide, in this embodiment, thirty-six teeth 34, defining between them thirty-six slots 35 in which the windings 31, 32 and 33 extend. The stator teeth 34 are indicated by the radially extending lines in FIGURE 3, and the positions of the various windings within the slots can be observed from that figure.

The stator of this embodiment is square in outside configuration, and has formed in the sides to which the reactors 4 and 5 are secured and perpendicularly to their respective sides, four air gaps 36 and 36' and 37 and 37', in the form of slots extending from the outside surface of the stator inwardly to a point near but spaced from the roots of contiguous slot-defining teeth. This leaves bridges 38 and 38', and 39 and 39' respectively, between the base of the air gaps and the roots of the adjacent slots.

In this embodiment, the cores of reactors 4 and 5 are identical. Each is a half shell type, with outer legs 41 and 42 and a center leg 43. The legs 41, 42 and 43 have flat faces which bear on the flat outer surface of the stator. The legs 41, 42 and 43 define winding receiving cavities 44 and 45, in which, as is shown diagrammatically in FIGURE 3, three windings are positioned. These windings are reactor-based rotor exciting windings 46 and 47 in the reactors 4 and 5 respectively, and weld windings 48 and 49 in the reactor 4 and 50 and 51 in the reactor 5.

As can be observed from FIGURES 2, 3 and 4, the stator based rotor exciting windings 31 and 31', are connected in series with the reactor based rotor exciting windings 46 and 47, and all of the exciting windings are connected in series to a full wave rectifier 60, and are connected to a variable transformer 70. The rectifier 60 is, in turn, electrically connected with A.C. slip rings 26 and 27, connected to the four rotor windings 25.

As can be observed from FIGURES 2 and 3, the weld windings in the stator are electrically connected in series with the weld windings in the reactor but in such a way that stator weld windings 33 and 33" are connected in series with reactor weld windings 48 and 50, and alternatively with reactor weld windings 49 and 51, hence to a high performance electrode 90, or to stator weld windings 33' and 33''', hence to an electrode 95.

In the operation of the welder illustrated and described, assuming that the machine is entirely shut down, and that the electrode is not in position to be grounded, the rotor, which is not rotating, still retains some residual magnetism in its iron. When the internal combustion engine or other power source is started to drive the rotor, and the rotor begins to rotate within the stator, the residual magnetism in the rotor acts to create flux in the stator iron which takes a path through the bridges 38 and 38' and 39 and 39', as indicated in dotted lines in FIGURE 1 and by the flux line in the lower left quadrant of FIGURE 4. This flux, in turn, generates in the stator based rotor exciting windings 31 and 31' a voltage, substantially unopposed by the reactor based motor exciting windings, which is imposed through the variable transformer and the rectifier, on the rotor winding 25, through the slip rings 26 and 27. This excites the rotor windings, causing an increase in the rotor flux, which quickly saturates the iron in the relatively narrow bridges 38 and 38' and 39 and 39'. The air gaps 36, 36', 37 and 37" then act to divert the flux in a path indicated in full lines in FIGURE 1 and the flux line in the upper left quadrant of FIGURE 4, through the stator and reactor iron, around the cavities 44 and 45, and the windings therein. This flux generates in the rotor exciting winding of the reactor a voltage which opposes the voltage of the stator based rotor exciting winding. Since these rotor exciting windings are connected in series, the resultant voltage to the rotor coils 25 is low. In this preferred embodiment, the stator based rotor exciting windings and the reactor based rotor exciting windings have about the same number of turns in them. They are not exactly opposed; they may be considered not exactly 180° out of phase, so that there is a constant, appreciable, but low, resultant voltage applied to the rotor coils. This provides a low open circuit voltage to the welding terminals.

When the electrode is touched to the workpiece, shorting the weld winding circuit, there is a large flow of current from the stator weld windings, through the reactor weld windings. This sets up a strong flux in the reactor iron, which takes a path around the winding of the reactor, and of necessity through a part of the stator iron as indicated by the dot and dash lines in FIGURE 1 and the reactor flux line in the upper right quadrant of FIGURE 4. This in effect repels the rotor flux and diverts the rotor flux through a path which takes it across the air gaps, as indicated in dashed lines in FIGURE 1 and by the flux line in the upper right quadrant of FIGURE 4. This reactor flux, in turn, generates in the reactor based rotor exciting winding an "independent" voltage (independent of the rotor flux) which now supplements the voltage from the stator based rotor exciting winding. This augmented voltage is, of course, immediately imposed upon the rotor coils 25, which are thus immediately energized to an extent limited only by the variable transformer and the saturation characteristics of the stator and reactor cores.

As an arc at the electrodes is formed, and the electrode is drawn back to welding position, the usual balance between the voltage drop across the arc and the reactor is established, i.e., the reactor performs its ballast (phase shifting) function in the conventional way.

Figure 5:
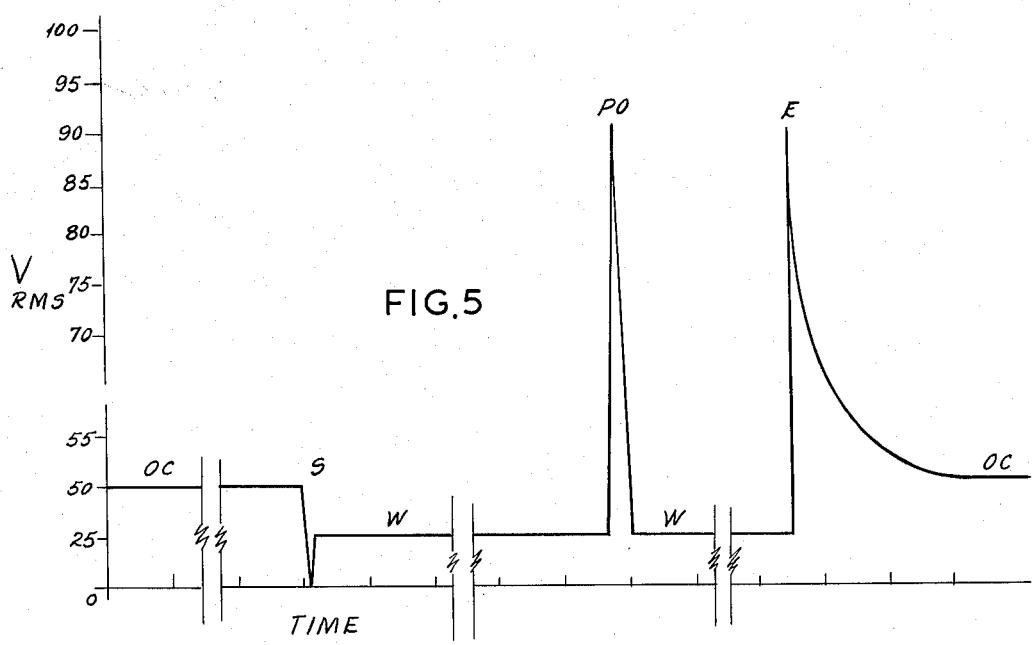
FIGURE 5 is a graph showing, in a general way, voltage and various R.M.S. voltage/time relations at open circuit (OC), during striking of an arc (S), welding (W), arc pop-out (PO) and arc extinguishing (E).

As has been described above, the reactor based weld winding serves to perform the usual phase-shifting function of conventional reactors and also to generate in the reactor-based rotor exciting winding a voltage which supplements voltage from the stator based rotor exciting winding, a function different from that performed by reactor windings known heretofore. Still another function has been indicated, that of generating a relatively high arc-stabilizing voltage for several cycles. This has been explained to some extent above, but the theory (which, per se, forms no part of this invention) can be further explained by reference to FIGURES 1, 4 and 5. The latter figure illustrates actual voltages in an illustrative embodiment of welder described.

If it be assumed that the rotor is being driven and the welder is in open circuit condition, the voltage (R.M.S.) at the terminals is constant and is low compared with the open circuit voltage of conventional A.C. machines, as indicated by the part of the line designated "OC." When the electrode is touched to the workpiece, shorting the system, the voltage drops, momentarily, as indicated at "S" on the graph. As the arc is started and the electrode drawn back, the weld voltage ("W" on the graph) is established at a somewhat lower level than the open circuit voltage. The path of the rotor flux under weld conditions is indicated in FIGURE 1 by the dotted lines going through the air gap, and in FIGURE 4, by the flux line in the upper right quadrant. If the arc pops out, the current through the reactor weld winding stops, and the path of the rotor flux changes almost instantaneously to the open circuit path through the reactor indicated in solid lines in FIGURE 1 and by the flux line in the upper left quadrant of FIGURE 4. While this flux starts to generate an opposing voltage in the reactor based rotor-exciting winding, the inductance in the rotor, is sufficient to provide continued high exciting current for several cycles (the number of cycles being determined by the characteristics of the rotor, stator and reactor). The rotor flux, through the reactor, then generates a supplementing weld voltage in the reactor weld winding, which, again depending upon the numbers of turns, etc., produces an arc-stabilizing voltage substantially higher than normal open circuit voltage. This is indicated at "PO" on the graph on which at this point the voltage/time relation is predicated on the assumption that the arc was restarted within one or two cycles. When the arc is extinguished deliberately ("E" on the graph), the normal low open circuit condition is substantially reestablished in the space of six cycles or so (depending upon the particular design). This pattern of open circuit and arc-stabilizing voltage minimizes electrical shock hazard to the operator while substantially improving arc stability.

The momentary high rise in voltage at pop out in the welder of this invention is unique among A.C. machines. It permits an extremely low open circuit voltage to be used, as compared with conventional machines, and, at the same time, provides higher arc stability than has been permissible in A.C. machines heretofore. This is because in conventional A.C. welders, the open circuit and arc-stabilizing voltages are substantially one and the same, which, because of safety considerations, puts a relatively low upper limit on the arc-stabilizing voltage and puts a relatively high lower limit on the open circuit voltage.

The bridges of iron, 38, 38' and 39 and 39' in the stator, or, in another embodiment, very narrow necks in the air gaps, also contribute to stable low open circuit voltage by off-setting the reactor saturation curve in relation to the stator saturation characteristic, permitting a stable condition without saturation.

By adjusting the variable transformer, output current may be continuously controlled over a wide range while maintaining arc stability which is superior to that now possible in commercial brand arc-welding machines.

Merely by way of illustration, and not of limitation, the two rotor exciting windings can be arranged to produce an exciting current at open circuit of half an ampere, and at full load, of eight amperes. The open circuit voltage can be thirty to fifty volts, the voltage instantly available to stabilize the arc, seventy to a hundred volts. In the illustrative embodiment shown, the current to the high performance electrode 90 may be adjusted from 40 to 125 amps by means of the variable transformer; the current to the electrode 95, from 40 to 250 amps.

To accomplish these ends, the rotor windings 25 can each contain 375 turns; the reactor 4 can contain seven turns of the exciting winding 46, eight turns of the weld winding 48 and seven turns of the weld winding 49; the reactor 5 can contain twenty-six turns of the exciting winding 47, eight turns of the weld winding 50 and seven turns of the weld winding 51, and the stator can contain twelve turns of rotor exciting winding 31, twenty-one turns of rotor exciting winding 31' and five turns each of weld windings 33, 33', 33" and 33'".

The preferred embodiment described has numerous advantages in efficiency and in ease of construction, but other embodiments are possible. The provision, in the preferred embodiment, of the bridges of iron between the inner ends of the air gaps and the bottoms of the winding receiving slots of the stator, facilitates excitation. In a slightly different embodiment, the air gaps take the form of deep stator slots, terminating short of the reactor cavities, to provide bridges located near an outer edge of the stator core. The welding of the reactor core to the outer surface of the stator core permits the reactor core to be wound very readily before it is welded in place. However, it is possible, and may under certain conditions be desirable, to make the stator and reactor cores integral with one another. In that event, an air gap, preferably with a narrow neck at the base of the stator slot, can extend between and communicate at its respective ends with the cavity of the reactor core and a stator slot. With such a construction, the reactor can be wound through the stator slot-air gap passage.

The reactor could even by physically separated from the stator, although this would eliminate substantial advantages of the provisions of the bridges, among other things. Additionally, in the arrangement of separate reactor, the saving of material and speed of response would be considerably less.

Numerous variations in the construction of the welder of this invention, within the scope of the appended claims, will occur to those skilled in the art in the light of the foregoing disclosure. For example, either two or four pole alternators can be used; a multiplicity of reactors may be provided, e.g., four reactors on a four pole alternator; different types of reactors may be used; various voltage limiting or controlling devices, such as a controlled rectifier, switch and taps in the exciting winding circuit, or a rheostat, can be employed, and the like.

Having thus described the invention, what is claimed and desired to be secured by Letters Patent is:

1. In a rotating A.C. welding machine having a rotor with winding adapted to be electrically energized and a stator with windings in which an alternating current is generated, the improvement comprising a reactor having a rotor-exciting reactor winding positioned with respect to the rotor and stator to share a common electrical flux therewith at open circuit and connected in series to rotor-exciting windings in said stator in such electrical relation as to be close to 180° out of phase at open circuit with the said stator based rotor-exciting winding, and load responsive means in such relation to the said reactor based rotor-exciting winding as to cause it to be close to in phase with the stator based rotor exciting winding at short circuit, said stator based rotor-exciting windings and said reactor based rotor-exciting windings being electrically connected in series to said rotor winding.

2. In a rotating A.C. welding machine having a rotor with winding adapted to be electrically energized and a stator with an iron core and stator weld and rotor-exciting windings in which an alternating current is generated, the improvement comprising a reactor having a core mounted on and adapted to share common flux with said stator, said reactor having a rotor-exciting winding, electrically connected in series with said rotor-exciting winding in said stator, and reactor based weld winding electrically connected with said weld winding in said stator, the core of said reactor forming a preferential path of flux generated by said rotor during open circuit, said reactor based weld winding being wound to oppose the passage of rotor flux through said reactor during welding.

3. In a rotating A.C. welding machine having a rotor with winding adapted to be electrically energized and a stator with windings in which an alternating current is generated, the improvement comprising stator based rotor exciting windings and a reactor with reactor based rotor exciting windings both of said rotor exciting windings being electrically connected to said rotor winding serving as the sole source of exciting current to said rotor winding, and a load responsive winding electrically connected to the welder circuit and means for magnetically coupling said load responsive winding to said reactor-based exciting winding to modify the output of said exciting winding in such a way as to decrease the voltage from the exciting windings to said rotor winding at open circuit and increase the voltage from said exciting windings to the rotor winding under load.

4. In a rotating A.C. welding machine having a rotor with winding adapted to be electrically energized and a stator with windings in which an alternating current is generated, the improvement comprising a rotor-exciting winding electrically connected to said rotor winding, a load responsive winding and iron means coupling the said rotor-exciting winding and said load responsive winding in such a way as to decrease the output from said rotor-exciting winding to said rotor winding at open circuit and increase the output from said rotor-exciting winding to said rotor winding under load.

5. In a rotating A.C. welding machine having a rotor with winding adapted to be electrically energized and a stator with an iron core and weld windings and rotor-exciting windings in which an alternating current is generated, the improvement comprising an iron-core reactor mounted on said stator core, said stator having an air gap in its iron core within the span of said reactor, said reactor having a rotor exciting winding electrically connected in series with said rotor-exciting winding in said stator, and a reactor-based weld winding electrically connected with said stator weld winding, said air gap being positioned to divert rotor flux to a path through said reactor during open circuit operation, and said reactor-based weld winding being adapted to generate a flux in said reactor under load to divert said rotor flux through said air gap.

6. The machine of claim 5 wherein the stator air gap extends from the root of a stator slot to a winding cavity in said reactor.

7. The machine of claim 5 wherein the reactor and stator iron is integral.

8. The machine of claim 6 wherein a narrow neck is provided in the air gap.

9. The machine of claim 5 wherein the reactor is a half shell type, and two air gaps, one adjacent each winding cavity of the reactor, are provided.

10. The machine of claim 5 wherein a plurality of symmetrically disposed reactors are mounted on the stator and the stator is provided with air gaps adjacent each of said reactors.

11. In a rotating A.C. welding machine having a rotor with winding adapted to be electrically energized and a stator with an iron core and stator based weld windings and stator based rotor-exciting windings in which windings an alternating current is generated, the improvement comprising a reactor mounted on said stator, said stator having an air gap in its iron core within the span of the reactor, and a bridge of iron extending between the said air gap and the roots of the slot-defining teeth immediately adjacent said air gap, said reactor having a rotor-exciting winding electrically connected in series with said stator based rotor-exciting winding and a reactor based weld winding electrically connected with said stator based weld winding, said bridge of iron forming a rotor flux path upon initiation of rotation of said rotor and being proportioned to saturate at normal open circuit operation of said machine, said air gap being positioned to divert rotor flux to a path through said reactor during open circuit operation, and said reactor based weld winding being adapted to generate a flux in said reactor under load to divert said rotor flux through said air gap.

12. In a rotating A.C. welding machine having a rotor with winding adapted to be electrically energized and a stator with an iron core with slots and windings in said slots in which windings an alternating current is generated, the improvement comprising a half shell reactor core having a bridging piece and three legs defining between them two cavities, a flat face of each of said legs being secured to said stator, with said reactor core having windings within said cavities contiguous said stator, said stator having air gaps in its iron core opening into said reactor cavities but terminating short of the slots in said stator adjacent the base of said air gaps, thus providing a bridge of iron between the base of said air gaps and said slots; rotor-exciting windings in said stator electrically connected in series to rotor-exciting windings in both said reactor, said rotor-exciting windings being electrically connected through a rectifier and variable transformer to the windings of the rotor; said rotor being adapted to retain some residual magnetism when it is unenergized; weld windings in said stator electrically connected in series to weld windings in said reactor, said reactor weld windings being positioned and oriented physically and electrically with respect to the reactor based rotor-exciting winding as to generate, under load, a voltage in said reactor based rotor-exciting winding which supplements the voltage created by the rotor in the stator-based rotor-exciting winding.

13. In a rotating A.C. welding machine having a rotor with winding adapted to be electrically energized and a stator with windings in which an alternating current is generated, the improvement comprising a rotor-exciting winding positioned to be energized by rotor flux and electrically connected to said rotor winding; and a load responsive winding, magnetically coupled to said rotor-exciting winding and electrically connected to a stator winding, adapted to generate under load a voltage in the rotor-exciting winding.

14. An A.C. welding machine comprising a wound rotor, a stator having a stator based weld winding and a reactor, said reactor having a core and weld winding on said core, said reactor core being so related to said stator as to provide a preferred path for rotor flux when no current is flowing through the reactor based weld winding, whereby voltage is generated in said reactor based weld winding, said reactor based weld winding being so oriented as to divert said rotor flux from the reactor core when current flows through the reactor based weld winding, so that the voltage generated in said reactor based weld winding when current is flowing therethrough opposes the voltage generated in the stator based weld winding, and when the flow of current through the reactor based weld winding is interrupted, the voltage generated in said reactor based weld winding, aids the voltage generated in the stator based weld winding; whereby upon initial interruption of flow of current through the reactor based weld winding a relatively high arc-stabilizing voltage is generated for a period of more than one cycle; and means responsive to restoration of the rotor flux path through the said reactor, upon said interruption, for reducing excitation of the rotor over a period of several cycles.

References Cited by the Examiner

UNITED STATES PATENTS

| | | | |
|---|---|---|---|
| 1,893,354 | 1/1933 | Bergman | 322—45 |
| 2,264,272 | 12/1941 | Blanheubuehler et al. | 310—190 |
| 2,564,514 | 8/1951 | Thomas | 322—57 |

LLOYD McCOLLUM, *Primary Examiner.*

A. H. TISCHER, W. H. BEHA, *Assistant Examiners.*